United States Patent [19]
Jennings, Jr.

[11] Patent Number: 5,159,979
[45] Date of Patent: Nov. 3, 1992

[54] METHOD FOR LIMITING DOWNWARD GROWTH OF INDUCED HYDRAULIC FRACTURES

[75] Inventor: Alfred R. Jennings, Jr., Plano, Tex.

[73] Assignee: Mobil Oil Corporation, Fairfax, Va.

[21] Appl. No.: 769,274

[22] Filed: Oct. 1, 1991

[51] Int. Cl.$^5$ .......................................... E21B 43/267
[52] U.S. Cl. ................................. 166/280; 166/300; 166/308
[58] Field of Search ............... 166/280, 281, 300, 308

[56] References Cited

U.S. PATENT DOCUMENTS

| | | | |
|---|---|---|---|
| Re. 30,484 | 1/1981 | Broaddus et al. | 166/307 |
| 3,121,464 | 2/1964 | Huitt et al. | 166/280 |
| 3,126,056 | 3/1964 | Harrell | 166/280 |
| 3,127,937 | 4/1964 | McGuire, Jr. et al. | 166/280 |
| 3,155,159 | 11/1964 | McGuire, Jr. et al. | 166/280 |
| 3,224,506 | 12/1965 | Huitt et al. | 166/280 |
| 4,210,206 | 7/1980 | Ely et al. | 166/283 |
| 4,478,282 | 10/1984 | Nolte et al. | 166/281 |
| 4,887,670 | 12/1989 | Lord et al. | 166/281 |
| 4,928,763 | 5/1990 | Falk | 166/300 X |
| 5,036,919 | 8/1991 | Thomas et al. | 166/308 X |

*Primary Examiner*—George A. Suchfield
*Attorney, Agent, or Firm*—A. J. McKillop; C. J. Speciale; C. A. Malone

[57] ABSTRACT

A method for limiting a downward growth of one or more vertically oriented fractures in a subterranean formation during a fracturing treatment. Initially, a first fracturing fluid with a known density is introduced into a formation having at least one fracture. The first fracturing fluid comprises a cross-linked gel composition sufficient to form a viscous gel in the fracture and also contains gel breakers. Thereafter, a second fracturing fluid is introduced into the fracture. This second fracturing fluid has a density lower than said first fracturing fluid. Additionally, the second fracturing fluid contains a proppant. The second fracturing fluid is continually introduced into the fracture thereby displacing the first fracturing fluid into a lower portion of the fracture where a substantially viscous gel forms. Thereafter, the first fracturing fluid breaks faster than the second fracturing fluid containing the proppant which causes the lower portion of the fracture to close while allowing the upper part of said fracture to be propped thereby limiting the downward growth of said fracture while substantially minimizing fracture intrusion into an underlying zone.

4 Claims, 1 Drawing Sheet

METHOD FOR LIMITING DOWNWARD GROWTH OF INDUCED HYDRAULIC FRACTURES

FIELD OF THE INVENTION

This invention concerns a method for limiting the downward growth of vertical fracture when hydraulically fracturing a hydrocarbonaceous fluid containing formation or reservoir.

BACKGROUND OF THE INVENTION

A variety of techniques have been developed and used for stimulating the production of oil and gas from subterranean formations penetrated by wellbores. One commonly used technique for stimulating producing formations formed of relatively low permeability materials comprises pumping a fracturing fluid at a pressure and rate into the formation whereby one or more fractures are hydraulically created. The fractures are extended by continued pumping, and a propping agent such as sand transported by the fracturing fluid is deposited in the fractures. The propping agent functions to maintain the fractures open after the hydraulic pressure on the formation is withdrawn.

Another commonly used production stimulation technique is known in the art a fracture acidizing. Fracture acidizing consists of creating and extending one or more fractures followed by etching the fracture faces with acid so that when hydraulic pressure on the formation is withdrawn, flow channels remain through which desired fluids contained in the formation flow to the wellbore.

While most wells are completed in a zone of best possible oil and/or gas production, it has heretofore been difficult to prevent a created fracture or fractures from extending vertically above and/or below the desired zone, often resulting in the fractures extending into less desirable zones in the formation or into adjacent formations. For example, zones capable of producing excessive water often lie adjacent to or are in close proximity to preferred production zones. When fracture treatments are carried out to stimulate the production of oil and/or gas from the preferred zones, the created fractures can extend into water producing zones resulting in the production of undesirable water along with desired oil and/or gas.

A number of techniques have been proposed for controlling the growth of fractures. These have met with varying degrees of success. For example, U.S. Pat. No. 3,335,797 issued Aug. 15, 1967 discloses a method of controlling the direction of fractures created during hydraulic fracturing where a propping agent is caused to be placed at the bottom of the fractures to inhibit subsequent downward fracturing during the extension of the fractures. U.S. Pat. No. 3,954,142 issued May 4, 1976 is directed to methods of confining a subterranean formation treatment such as an acidizing treatment to a desired zone within the formation by controlling the density of the various fluids involved. U.S. Pat. No. 4,509,598 issued Apr. 9, 1985 is directed to a method of limiting the upward growth of vertical fractures during a hydraulic fracturing treatment by including buoyant inorganic diverting agent in the fracturing fluid.

U.S. Pat. No. 4,515,214 issued May 7, 1985 is directed to a method for controlling the vertical growth of hydraulic fractures wherein the fracture gradients of the formation to be fractured and adjacent formations are first determined. Based on the fracture gradients, the density of fracturing fluid necessary to inhibit fracture propagation from the formation to be fractured into adjacent formations is determined. Afterwards, a fracturing fluid of such density is used to fracture the formation. U.S. Pat. No. 4,478,282 issued Oct. 23, 1984 is directed to a technique for controlling vertical height growth of fractures wherein a flow blocking material is utilized which forms a barrier to fluid flow into the vertical extremities of the fractures.

Lord et al. in U.S. Pat. No. 4,887,670 issued Dec. 19, 1989 teaches a method for controlling the growth of one or more vertically oriented fractures in a subterranean formation during a fracturing treatment. A first fluid having a known density and containing a fluid which may contain a proppant and having a known density different from the first fluid is next introduced into the fracture whereby the second fluid selectively overrides or underrides the first fluid. This fluid control causes the proppant to screen out and impede further downward or upward growth of the fracture.

What is needed is a method which limits vertical fracture propagation downwardly while further minimizing the fracture's intrusion into an underlying zone.

SUMMARY OF THE INVENTION

In the practice of this invention, a first fracturing fluid with a known density is introduced into a formation having at least one fracture. The first fracturing fluid comprises a cross-linked gel composition with internal gel breakers therein sufficient to form a viscous gel in a lower portion of said fracture. Next a second fracturing fluid having a density less than the first fracturing fluid and containing a proppant therein is introduced into the fracture. As the second fracturing fluid proceeds into the fracture, it partially displaces the denser first fracturing fluid into the lower portion of said fracture where a highly viscous cross-linked gel is formed.

As the second fracturing fluid continues to be introduced into the fracture, the high viscosity first fracturing fluid fills the lower portion of the fracture and begins to break which causes the first fracturing fluid to liquefy and decrease in viscosity. This decrease in viscosity allows the lower portion of the fracture to close since the first fracturing fluid is breaking faster and leaking off to the formation faster than the second fracturing fluid. While the lower portion of the fracture closes, proppant in the first fracturing fluid causes the upper portion of the fracture to remain open. Continued introduction of the second fracturing fluid into the fracture causes the proppant therein to screen out so to preclude additional fracturing fluid from entering into the lower portion of the fracture which limits a downward growth of the fracture while substantially minimizing intrusion of the fracture into and underlying zone.

It is therefore an object of this invention to minimize downward fracture propagation into and underlying zone which may be a bottom water zone.

It is another object of this invention to position a proppant substantially along an interface formed between upper and lower portions of a fracture so as to inhibit downward growth of a fracture into an underlying zone.

It is yet another object of this invention to control placement of proppant into a fracture to minimize intrusion into an underlying zone.

It is still another object of this invention to control proppant placement into an upper portion of a fracture so as to minimize the fracture's downward growth while extending the fracture further longitudinally into the formation to a desired extent.

DESCRIPTION OF THE PREFERRED EMBODIMENTS

In performing hydrocarbon production stimulation treatments in subterranean formations penetrated by wellbores, particularly those formed of relatively impermeable and fracturable materials, it has become common practice to hydraulically induce fractures in the most desirable zones of such formations and extend the fractures outwardly from the wellbores. Propping agent, e.g., sand, is distributed into the fractures as they are extended whereby upon the withdrawal of hydraulic pressure from the formations, the fractures are propped open and hydrocarbon fluids contained in the formations more freely flow therefrom to the wellbores. In most formations, the hydraulically induced fractures are vertically oriented, i.e., the faces of the fractures lie in substantially vertical planes.

Figure 1:
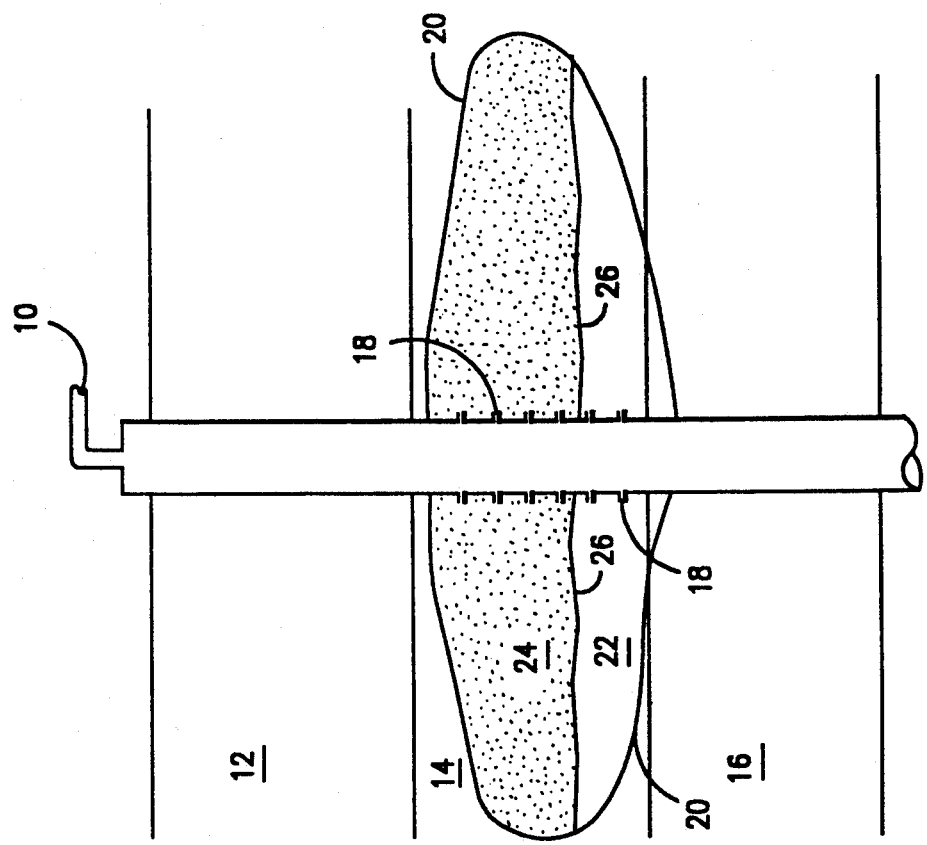
FIG. 1 is a schematic representation which depicts placement of a conventional hydraulic fracture into a formation.

Hydraulic fracturing of a subterranean formation is accomplished by pumping a fracturing fluid through the wellbore into the formation to be fractured at a rate and pressure such that the hydraulic force exerted on the formation causes a parting or fracturing of the formation. This hydraulic force is usually caused to be exerted on the formation at a location adjacent the most productive and desired zone by way of perforations formed in the wellbore casing and the formation. A method for hydraulic fracturing is disclosed in U.S. Pat. No. 4,669,546 which issued to Jennings, Jr. on Jun. 2, 1987. This patent is hereby incorporated by reference herein. A conventional hydraulic fracture is shown in FIG. 1. Once fractures have been formed in the zone, continued pumping of the fracturing fluid into the fractures extends the fractures. While it is desirable that the fractures be extended outwardly from the wellbore through the productive zone of the formation, it is often undesirable to extend the fractures downwardly. Unfortunately, continued application of hydraulic force within vertically oriented fractures often causes the fractures to extend downwardly as well as outwardly from the wellbore. If undesirable zones lie below the desired productive zone, and if during the fracture treatment fractures are extended into the adjacent undesirable zones, fluids therefrom are produced along with fluids from the desired zone into the wellbore. For example, zones containing excessive water can lie adjacent oil and/or gas producing zones. Therefore stimulation of water production with the oil and/or gas is a highly undesirable result. In other situations, the downward growth of fractures into poorly producing or nonproducing strata below the productive zone can reduce the stimulation effectiveness of the fracturing treatment.

The present invention provides methods of controlling the downward growth of one or more vertically oriented fractures in a subterranean formation during the performance of a fracturing treatment. If downward fracture growth is undesirable, the method of the present invention can be utilized to impede the growth of fractures downwardly while allowing outward and upward fracture growth to occur.

Figure 2:
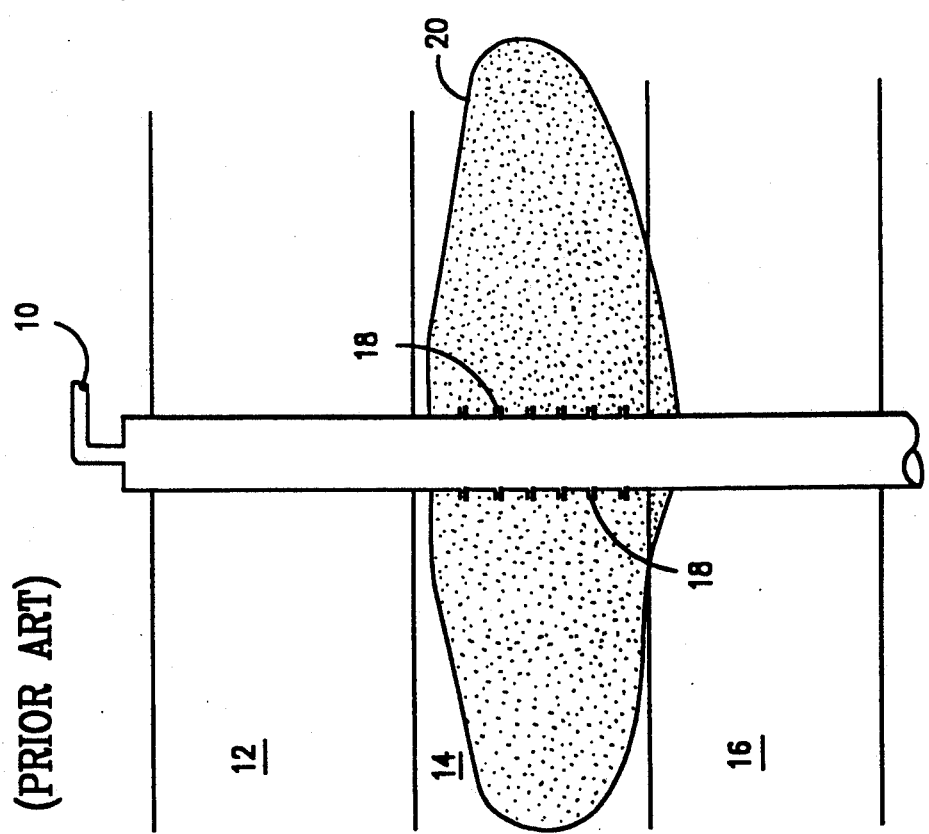
FIG. 2 depicts schematically a closed bottom portion of a fracture while proppant is suspended in an upper portion of the fracture.

Referring now to FIG. 2, the method of the present invention for controlling the downword growth of one or more vertically oriented fractures is illustrated schematically. As shown in FIG. 2, a vertically oriented fracture 20 in subterranean formation 12 extends outwardly from wellbore 10 penetrating formation 12. Wellbore 10 has perforations 18 disposed therein and penetrates production zone 14. Perforations 18 are positioned adjacent and into desirable production zone 14 of formation 12. Formation 12 is broken down and fracture 20 is initially hydraulically induced by the injection of a high density, usually low viscosity preflush fluid (often referred to as a prepad) into the formation. That is, a preflush fluid such as water containing the usual additives, e.g., friction reducing and fluid loss control agents is pumped into the formation 12 by way of perforations 18 at a rate and pressure such that at least one fracture 20 is hydraulically induced in production zone 14.

As shown in FIG. 2, after injection of the preflush fluid, a first fracturing fluid (often referred to as a pad) having a high density, a moderate to high viscosity and lacking diverting agent suspended therein is injected into the fracture. A large volume of the first fracturing fluid, typically about 5% to 50% of the total volume of all of the fluids injected, is usually introduced into fracture 20. The preflush and first fracturing fluid can contain weighting agents to increase their density such as calcium chloride and sodium chloride salts. Moderate to high viscosity can be imparted to the first fracturing fluid by viscosity increasing agents, e.g., guar and guar derivatives such as hydroxypropylguar, cellulose derivatives such as hydroxyethylcellulose, synthetic polymers such as polyacrylamide, and other polymers, all of which may or may not be cross-linked.

Once sufficient first fracturing fluid has been placed into zone 14, a second fracturing fluid having a low density is introduced into the formation via perforations 18 into zone 14. As the low density fluid proceeds into zone 14, it displaces the higher density first fracturing fluid into water-bearing lower interval 16 below zone 14 via fracture 20. The second fracturing fluid will be introduced into zone 14 in a volume of about 10% of the total fluids which are used. Generally, the second fracturing fluid should have a density of at least 0.5 pounds per gallon less than the density of the first fracturing fluid. As a second fluid is continually introduced into hydrocarbonaceous fluid containing zone 14, a proppant is added to the second fracturing fluid. A delayed gelation of the first fracturing fluid causes it to becomes more viscous, thereby forming a gel block in lower portion 22 of fracture 20, and keeping proppant away from interval 16, the water-bearing part of zone 14.

Gel breakers contained in the first fracturing fluid are in an amount sufficient to cause the first fracturing fluid to break or "melt" faster than the proppant laden second fracturing fluid. Since the first fracturing fluid breaks faster than the second fracturing fluid, proppant contained in the second fracturing fluid remains in upper part 24 of fracture 20 and is unable to settle into lower part 22 of fracture 20 since the fracture closes due to the first fracture fluid breaking down faster. In this manner, proppant contained in the second fracturing fluid is positioned in fracture 20 substantially above interface 26 formed between the first and second fracturing fluids. So positioned, the proppant cannot move and the lower portion of fracture 20 remains closed. Thus, the proppants which have accumulated above interface 26, between the two fracturing fluids, screens out thereby preventing additional second fracturing fluid from preceding into lower portion 22 of fracture 20, and thus prevents proppant from being placed into the water-bearing interval 16.

Because the second fracturing fluid cannot proceed into lower portion 22 of fracture 20, fracture 20 extends longitudinally away from wellbore 10 thereby causing additional fracturing while preventing the downward movement of fracture 20 into bottom water or lower zone 16. Therefore, the intrusion of fracture 20 into bottom water or lower zone 16 is substantially minimized.

As is understood by those skilled in the art, the composition of the first and second fracturing fluids is formation dependent. The viscosity of the first and second fracturing fluids will depend upon the formation which is being fractured.

Preferred cross-linked gelled aqueous solutions which can be used herein are comprised of a gelling agent and a cross-linking agent which are activated at temperatures above about 120° F. and above. The composition forms a highly viscous cross-linked gel which remains highly viscous for long periods of time at temperatures up to and including about 350° F. These cross-linked gels are discussed in U.S. Pat. No. 4,210,206 that issued on Jul. 1, 1980 and which is hereby incorporated by reference herein.

Gelling agents useful herein are selected from the group consisting of water soluble hydratable polysaccharides having a molecular weight of at least about 100,000, preferably from about 200,000 to about 3,000,000 and derivatives thereof, water soluble synthetic polymers such as high molecular weight polyacrylamides, and water soluble hydratable polysaccharides which have been cross- inked with dialdehydes.

Examples of dialdehydes which can be utilized are glyoxal, malonic dialdehyde, succinic dialdehyde and glutaraldehyde.

Examples of suitable hydratable polysaccharides are guar gum, locust bean gum, karaya gum, carboxymethylcellulose, hydroxyethylcellulose and carboxymethylhydroxyethylcellulose. a particularly suitable hydratable polysaccharide is hydroxyethylcellulose having an ethylene oxide substitution within the range of about 1 to about 10 moles of ethylene oxide per anhydroglucose unit. A preferred such compound is hydroxyethylcellulose having an ethylene oxide substitution of 1.5 moles of ethylene oxide per anhydroglucose unit. Another preferred hydratable polysaccharide which is retarded at temperatures below about 100° F. is hydroxyethylcellulose having an ethylene oxide substitution of about 1.5 moles per anhydroglucose unit cross-linked with about 0.8 parts by weight glyoxal per 100 parts by weight hydroxyethylcellulose.

Examples of high molecular wight water soluble polyacrylamides are anionic copolymers of acrylamide and sodium acrylate, anionic random copolymers of polyacrylamide and a water soluble polyethylenically unsaturated monomer, and cationic copolymers of acrylamide and a quaternary amine acrylate having molecular weights greater than about 500,000. Of these, a cationic mixture of copolymers of acrylamide and a quaternary amine acrylate having an average molecular weight of about 1,000,000 is preferred.

In preparing the compositions of the present invention, one or more of the above described gelling agents are added to water in an amount in the range of from about 0.1 to about 13 parts by weight gelling agents per 100 parts by weigh of the water used. The temperature activated hexamethoxymethymelamine cross-linking agent is preferably combined with the aqueous gelling agent solution in an amount in the range of from about 0.05 to about 5 parts by eight cross-linking agent per 100 parts by weight of water used. When the resulting composition reaches a temperature of about 120° F., the hexamethoxymethylmelamine reacts with the gelling agent to form a cross-linked highly viscous semisolid gel.

The cross-linking reaction takes place at a high rate when the aqueous composition is maintained at a pH in the range of from about 2 to about 6. A pH of about 4 to about 5 is preferred. In order to insure that the desired pH is retained for a period of time sufficient to permit the composition to be introduced into the formation, a buffer can be incorporated into the composition. Examples of suitable buffers are potassium biphthalate, sodium biphthalate, sodium hydrogen fumarate, and sodium dihydrogen citrate. Of these, sodium biphthalate is preferred and is preferably combined with the composition in an amount in the range of from about 0.05 to about 2 parts by weight buffer per 100 parts by weight of water utilized.

A particularly suitable composition of the present invention for use as a fracturing fluid in high temperature formations is comprised of water; a cationic mixture of copolymers of acrylamide and a quaternary amine acrylate having an average molecular weight of about 1,000,000 presents in an amount in the range of from about 0.0–5 to about 3 parts by weight per 100 parts by weight of water used; hydroxyethylcellulose having an ethylene oxide substitution of 1.5 moles per anhydroglucose unit present in an amount in the range of from about 0.05 to about 5 parts by weight per 100 parts by weight of water; hydroxyethylcellulose having an ethylene oxide substitution of about 1.5 moles per anhydroglucose unit cross-linked with about 0.8 parts by weight glyoxal per 100 parts by weight hydroxyethylcellulose present in an amount in the range of from about 0.05 to about 5 parts by weight per 100 parts by weight of water; hexamethoxymethylmelamine present in an amount in the range of from about 0.05 to about 0.5 parts by weight per 100 parts by weight of water. While this composition has some viscosity after being prepared a ambient temperatures ordinarily encountered at the surface, the glyoxal cross-linked hydroxyethylcellulose component is not appreciably hydrated until reaching a temperature of about 100° F. Further, as stated above, the cross-linking agent, hexamethoxymethylmelamine, does not begin to cross-link the hydrated gels until reaching a temperature of at least about 120° F.

As will be understood by those skilled in the art, a variety of internal breakers can be used with the compositions of the present invention for causing the highly viscous cross-linked gel formed to revert to a fluid having a low viscosity. For example, a quantity of an internal breaker such as an oxidizing agent or an enzyme capable of hydrolyzing glucositic links can be added to the composition at the time it is prepared. Examples of suitable enzymes are alpha and beta amylases, amyloglucosidase, oligoglucosidase, invertase, multase, cellulase, and hemicellulase. Examples of suitable oxidizing agents are ammonium persulfate, potassium dichromate and potassium permanganate.

In utilizing the compositions of the present invention for treating high temperatures subterranean formations, the composition is prepared at the surface by first mixing the gelling agent or agents, internal breaker and other components with the water. The cross-linking agent, hexamethoxymethylmelamine is preferably combined with the aqueous solution last, and the resulting gel forming composition is introduced into the formation to be treated. Upon reaching the formation, the composition is heated by the formation whereby the desired highly viscous cross-linked semisolid gel is formed.

The proppant which is suspended within the second fracturing fluid can be any one of a variety of particulate material which will function to prop the fracture in the upper portion once the pressure on the formation has been released. Preferred proppants for use in accordance with this invention include those selected from the group consisting of sand, silica flour, oil-soluble resins and mixtures thereof. The most preferred proppant for use in impeding the downward growth of fractures is a mixture of about 70–170 U..S. mesh sand and silica flour of about 200 U.S. mesh or smaller. In those formations where high temperatures are encountered, silicon carbide or silicon nitride refractory proppants can be utilized. Proppants consisting of sand, silica flour, and oil-soluble resins are disclosed in U.S. Pat. No. 4,887,670 which issued to Lord et al. on Dec. 19, 1989. This patent is hereby incorporated by reference herein.

In carrying out the method of the present invention for propping a fracture in a high temperature well formation, after the treating composition having propping agent suspended therein is prepared, it is introduced, such as by pumping into the formation and into one or more fractures therein so that the composition is heated, the gelling agents contained in the composition are hydrated and the resulting hydrated gel cross-linked. The highly viscous semisolid gel formed in the fracture or fractures maintains the propping agent in uniform suspension and as a result, when the fracture or fractures are caused to close on the propping agent they are uniformly held open. The cross-linked gel is next caused to break or revert to a less viscous fluid so that it is removed from the formation without disturbing the propping agent distributed within the fracture or fractures.

Although the present invention has been described with preferred embodiments, it is to be understood that modifications and variations may be resorted to without departing from the spirit or scope of this invention, and those skilled in the art will readily understand. Such modifications and variations are considered to be within the pervue and scope of the appended claims.

What is claimed

1. A method for limiting a downward growth of one or more vertically induced fractures in a subterranean formation during a fracturing treatment comprising:
   a) introducing a first fracturing fluid into said formation and into at least one fracture formed therein where said first fracturing fluid is of a known density and contains a delayed cross-linking gel composition with internal gel breakers sufficient to form a temporary viscous gel in a lower portion of said fracture;
   b) introducing a second fracturing fluid into said fracture having a density less than that of said first fracturing fluid and which further contains a proppant therein;
   c) continuing the introduction of said second fracturing into the fracture thereby displacing the first fracturing fluid into a lower portion of said fracture whereby said first fracturing fluid forms a highly viscous gel; and
   d) allowing said first fracturing fluid to break faster than said second fracturing fluid containing said proppant which causes the lower part of the fracture to close while propping an upper part of said fracture thereby limiting the downward growth of said fracture while substantially minimizing fracture intrusion into an underlying zone.

2. The method as recited in claim 1 where the proppant is wedged within said fracture substantially above an interface formed between said first and second fracturing fluids.

3. The method as recited in claim 1 where said underlying zone comprises a bottom water zone.

4. The method as recited in claim 1 where said proppant is selected from a member of the group consisting of silica flour, sand, oil-soluble resins, refractory materials, and mixtures thereof.

* * * * *